United States Patent [19]

Marquis, III et al.

[11] 4,222,029
[45] Sep. 9, 1980

[54] VIBRATION ISOLATOR

[75] Inventors: Harold E. Marquis, III, Sparland; Nhiem D. Nguyen, Peoria, both of Ill.

[73] Assignee: Caterpillar Tractor Co., Peoria, Ill.

[21] Appl. No.: 939,525

[22] Filed: Sep. 5, 1978

[51] Int. Cl.² .................. B60Q 1/00; G01D 11/30; G08B 21/00; H01R 33/12

[52] U.S. Cl. .................... 340/52 R; 55/274; 73/430; 73/756; 210/90; 339/93 C; 340/607

[58] Field of Search .......... 340/52 R, 60, 607, 611, 340/614, 626, 693; 339/93 R, 93 C; 200/81.9 R; 73/430, 706, 756; 210/85, 90; 55/274, DIG. 34

[56] References Cited

U.S. PATENT DOCUMENTS

| | | | |
|---|---|---|---|
| 2,492,449 | 12/1949 | Tuller et al. | 340/626 |
| 2,523,083 | 9/1950 | Witkowski | 339/93 C |
| 2,549,309 | 4/1951 | Hill et al. | 336/205 |
| 2,811,674 | 10/1957 | Smith | 361/215 |
| 2,870,619 | 1/1959 | Greczin | 66/169 R |
| 2,897,675 | 8/1959 | Kocher et al. | 73/756 |
| 2,934,296 | 4/1960 | Gaubatz | 339/93 C |
| 3,127,586 | 3/1964 | Heyn et al. | 340/60 |
| 3,358,362 | 12/1967 | McElroy | 29/621 |
| 3,939,457 | 2/1976 | Nelson | 210/90 |
| 4,078,751 | 3/1978 | Stolzlechner | 73/430 |

FOREIGN PATENT DOCUMENTS 1295935  11/1972  United Kingdom ............ 73/430

Primary Examiner—John W. Caldwell, Sr.
Assistant Examiner—Joseph E. Nowicki
Attorney, Agent, or Firm—Wegner, Stellman, McCord, Wiles & Wood

[57] ABSTRACT

A vibration isolator is connected in line between an air intake tube (22) of an engine (14) and a pressure-responsive switch (30) to isolate the pressure-responsive switch from vibration during operation of the engine. The isolator includes a pair of metallic coupling members (52, 54) connected together by a resilient tube (50) providing fluid communication between the air tube (22) and the pressure-responsive switch (30). A conductive wire is disposed within the resilient tube for electrically connecting the switch in its associated indicator or warning light (32) circuit.

5 Claims, 4 Drawing Figures

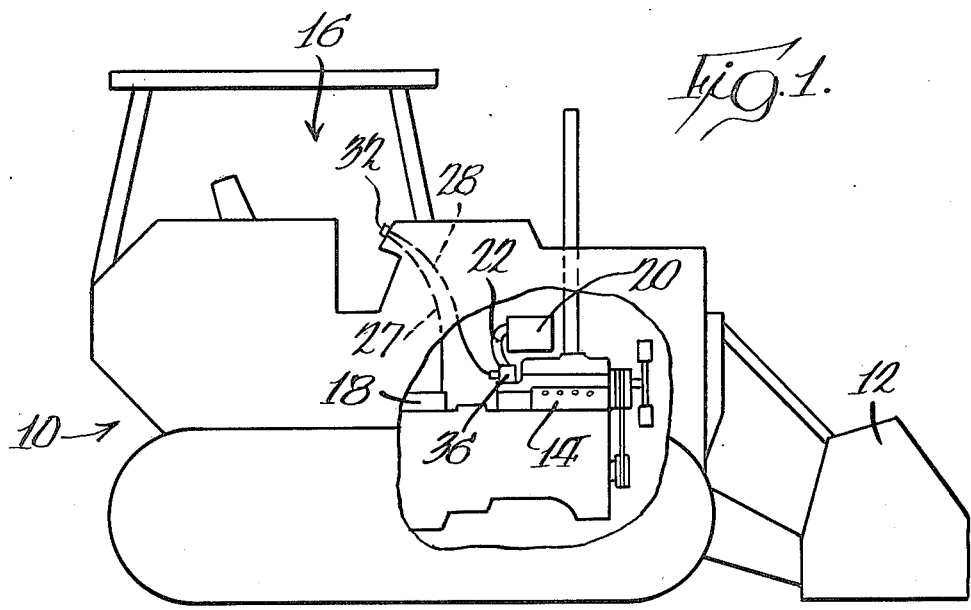
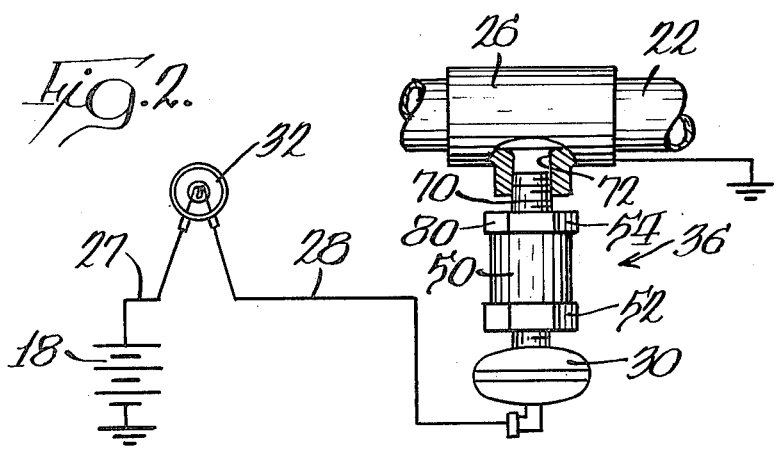
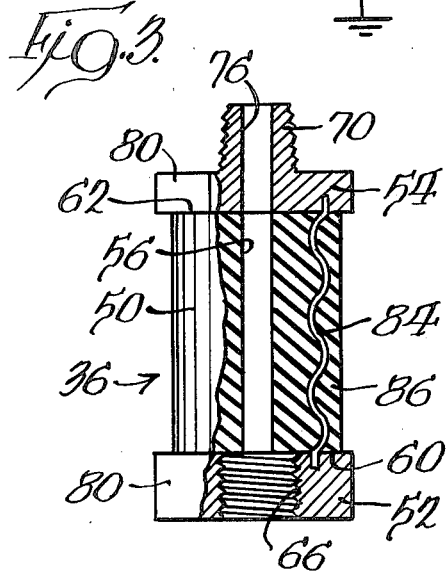
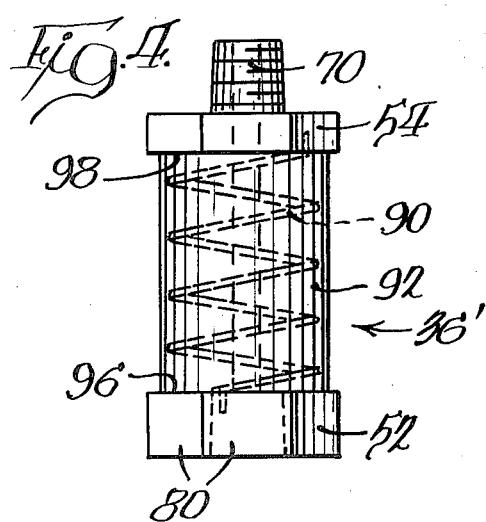

VIBRATION ISOLATOR

TECHNICAL FIELD

This invention relates generally to a connector limiting the transmission of vibration between two connected components and, more particularly, to a vibration isolator providing fluid communication and electrical communication between the two components.

BACKGROUND ART

Typically, a pressure-responsive switch is relatively delicate and when used in a harsh and severe environment where excessive vibration is encountered, it may fail within a very short period of time. One environment in which this type of switch is employed is in a vehicle, such as a crawler tractor or excavator, where the switch senses pressure to provide an indication to the operator as to whether the intake air cleaner is clogged. This environment is one of the most severe in terms of vibration where such a switch might be employed. In such an application, the switch has in the past been connected to the air intake tube by a metallic conduit to provide fluid communication therebetween and to also provide an electrical connection between the switch and the air intake tube as well. However, this conduit also transfers detrimental engine vibration directly to the switch causing premature failure.

DISCLOSURE OF INVENTION

The present invention is directed to overcoming one or more of the problems as set forth above.

In one aspect of the invention, a vibration isolator which is fitted between an air tube and a pressure-sensitive switch comprises a resilient member for isolating vibration between the ends thereof, a coupling element at each end to which the air tube and the switch may respectively be connected, and a conducting wire connected between the ends of the isolator to provide an electrical connection between the air tube and the switch when they are coupled to their respective ends of the isolator. The isolator has a passageway extending between the ends thereof providing fluid communication between the air tube and the switch. The coupling elements are metallic and are secured to the ends of the resilient member, which is a cylindrical tube.

The conducting wire is disposed within the resilient member and formed therein to allow the wire to be extended without breaking when the resilient member is distorted or twisted under vibration.

In an exemplary embodiment of the invention, the metallic wire is embedded within the resilient tube to protect it against corrosion or other damage.

In another exemplary embodiment of the invention, the metallic wire is coiled externally about the resilient member and is mechanically connected to the metallic coupling elements to provide the electrical connection therebetween.

BRIEF DESCRIPTION OF DRAWINGS

The details of construction and operation of the invention are more fully described with reference to the accompanying drawings which form a part hereof and in which like reference numerals refer to like parts throughout.

FIG. 1 is a side elevational view of a crawler tractor having a portion broken away to show the engine compartment where an embodiment of a vibration isolator constructed in accordance with the present invention is employed.

FIG. 2 is a view showing a vibration isolator connected between the air tube and the pressure-responsive switch and the warning indicator circuit.

FIG. 3 is an enlarged view of one embodiment of the vibration isolator partially broken away showing the conducting wire embedded within the resilient tube.

FIG. 4 is an enlarged view of an alternative embodiment of the vibration isolator showing the conducting wire coiled around the resilient tube.

BEST MODE FOR CARRYING OUT THE INVENTION

Referring to FIG. 1, a crawler tractor, generally designated 10, has a bucket mechanism 12 located forwardly thereof, and engine 14 and an operator's station, generally designated 16. The engine is provided with battery 18. Within the engine compartment is an air cleaner 20 which delivers combustion air to the engine 14 through an air intake tube 22.

As best seen in FIG. 2, the intake tube 22 is provided with a metallic T-shaped fitting or connector 26 such that fluid communication therewith is provided through a metallic conductor 28 to a pressure-responsive switch 30. A warning light or indicator 32 is mounted on the dashboard of a control console 34 at the operator's station 16 as illustrated in FIG. 1. The pressure-responsive switch 30 may have a diaphragm which causes contacts to close when no pressure is sensed within the intake tube 22. Such condition indicates air cleaner 20 is clogged.

When the switch 30 is closed, an electrical circuit is completed from battery 18 through conductor 27, indicator 32, conductor 28, pressure-responsive switch 30 and vibration isolator 36 to grounded metallic connector 26.

The vibration isolator 36, shown in FIG. 3, includes a central resilient elastomeric or rubber tube 50 and metal end fittings or coupling members 52 and 54. The cylindrical tube 50 has a passageway 56 extending longitudinally between its respective ends 60 and 62. The coupling member 52 is bonded to the end 60 of the tube 50 and has a threaded longitudinal bore 66 which is aligned with an end of the passageway 56 and is adapted to receive the threaded end of the conductor 28. The coupling member 54 is bonded to the end 62 of the tube 50 and has a longitudinally extending tapered shank 70. The shank 70 is externally threaded and is adapted to be received within the port of the connector 26 defined by tapered threaded bore 72. Extending through the coupling member 54 is a longitudinal bore 76 which is aligned with the end of the passageway 56. Thus, fluid communication is provided between the indicator switch 30 and the interior of intake tube 22.

The coupling members 52 and 54 are provided with external flats 80 so that the couplings have a hexagonal cross-sectional configuration and are also in alignment with one another to allow tightening of the isolator 36 to the connector 26 and the conductor 28.

The resilient tube 50 thereby isolates the vacuum indicator switch 30 from the vibration associated with the air intake tube 22 by absorbing any vibration or relative motion between the parts within the engine compartment. However, since the resilient tube also electrically insulates the coupling members 52 and 54, it is necessary that means be provided to conduct electricity past the resilient tube 50 to complete the circuit of the warning system and ground the vacuum switch 30. In past constructions, the connection of the metallic conductor 28 directly to the metallic connector 26 completed the circuit. This avoided the necessity of providing a separate electrical connection distinct from the air line connection.

In FIG. 3, one means of completing the electrical circuit in accordance with the invention is illustrated and consists of a thin, metallic conducting wire 84 which is embedded or bonded within the annular wall 86 of the tube and is physically connected by any suitable means to the metallic coupling members 52 and 54 at each end thereof. The disposition of the metallic conducting wire 84 within the wall of the tube 50 protects it against corrosion and damage. This wire thus provides means for electrically connecting the coupling members 52 and 54 and, hence, the indicator switch 30 and air intake tube 22 via the air line connection.

In FIG. 4, a modified embodiment of the vibration isolator, designated 36′, has a thin, metallic conducting wire 90 coiled externally around the cylindrical outer surface 92 of the resilient tube 50 that is connected to the metallic coupling members 52 and 54 to provide an electrical connection therebetween. Herein, the coupling members 52 and 54 have a diameter greater than that of the tube 50 so as to permit physical attachment of the wire 90 on the inner surfaces 96 and 98 of the coupling members 52 and 54, respectively, which extend radially outward beyond the outer surface 92 of the resilient tube 50.

The wire 84 in the FIG. 3 version is sinuously configured and the wire 90 in the FIG. 4 version is coiled so as to permit linear extension thereof without breaking when the resilient tube 50 is flexed or deformed by vibration transferred to it by the engine. Effectively, no vibration is transferred via this sinuous thin wire between the ends of the isolator.

It is understood that the metallic coupling members 52 and 54 may take any suitable form. For example, both the coupling members 52 and 54 may be made from conventional hex nuts with the coupling member 54 being provided with an externally threaded nipple having one end threaded into the body of the coupling member 54 and the other end threaded into the connector 26

It is also understood that the resilient tube 50 may be constructed by bonding the coupling members 52 and 54 or hex nuts together with a resilient material so as to obtain a flexible bond of sufficient dimension to isolate vibration and maintain a tight fluid connection between the couplings during use.

INDUSTRIAL APPLICABILITY

The flexible vibration isolators 36 and 36′, shown respectively in FIGS. 3 and 4, are effective in preventing the transfer of vibration from the engine 14 of the tractor 10 by absorbing vibration. Yet, they provide fluid communication between the air intake tube 22 and the pressure-responsive switch 30, and also act to complete an electric circuit therebetween through wire 84 or wire 90 to allow the switch 30 to be electrically connected to indicator 32.

Other aspects, objects and advantages of this invention can be obtained from a study of the drawings, the disclosure and the appended claims.

What is claimed is:

1. In a vehicle (10) having an engine (14) with an air cleaner (20) and an indicator (32) at an operator's station (16) for indicating a clogged condition of the air cleaner (20), said indicator responsive to a pressure-responsive switch, the improvement comprising a vibration isolator for connecting said pressure-responsive switch to said engine including:
    a resilient member (50) formed from resilient elastomeric material having a passageway (56) defined between opposite ends (60,62) thereof;
    a pair of coupling elements (52,54) each having an opening in communication with said passageway and being connected to a respective end (60,62) of said resilient member (50), an air tube (22) running from said engine to said air cleaner and being connectable to one coupling element (54) and the switch (30) being connectable to the other coupling element (52); and
    a conducting wire (84 or 90) connected to and extending between said coupling elements (52,54).

2. The vibration isolator of claim 1 wherein said conducting wire (84) is embedded in said resilient member (50).

3. The vibration isolator of claim 1 wherein said conducting wire (90) is coiled about the exterior of said resilient member (50).

4. The vibration isolator of claim 2 wherein said conducting wire (84 or 90) is sinuously configured.

5. The vehicle of claim 1 wherein one coupling element (52) has an internally threaded bore 66 and the other coupling element (54) has an externally threaded shank (70), and further including a metallic conductor (28) threaded into said bore (66) and connected to said warning switch (30) and a T-fitting (26) in the air tube (22) having a port (72) adapted to receive the threaded shank (70) of the other coupling element (54).

* * * * *